United States Patent Office 3,194,027
Patented July 13, 1965

3,194,027
AIR-CONDITIONER WITH ENCLOSED
CONTROL COMPONENTS
Richard H. Prendergast, Columbus, and Anthony H. Kelly, Upper Arlington, Ohio, assignors to Westinghouse Electric Corporation, Pittsburgh, Pa., a corporation of Pennsylvania
Filed Feb. 27, 1963, Ser. No. 261,306
15 Claims. (Cl. 62—180)

This invention relates to air-conditioning apparatus and particularly to a self-contained unit air conditioner for cooling an enclosure.

In air-conditioning apparatus functioning to recirculate room air over a conditioning medium, a common electric control in use is the gas or vapor filled bulb type. A characteristic of this type of control is that it responds to the coldest temperature, whether sensed at the vapor filled sensing bulb, along the connecting capillary tube, or at the bellows of the controlling device. These controls are usually installed in the air-conditioning unit with the controlling device mounted on a wall of the unit housing at a position convenient for the user to adjust, while the temperature sensing bulb extends into the intake air stream.

In units of this type, it is often desirable that electric components be contained in fire resistant enclosures for safety purposes. Enclosing the controlling device so that it is out of contact with the circulating room air presents a problem in that the bellows at the control device and a portion of the capillary tube is effected by the temperature of the housing and enclosing walls, which temperature may differ considerably from the room air temperature being sensed at the bulb.

A solution to this problem has been to change from a vapor filled type of control to a liquid filled type of control.

Unlike the vapor filled control which operates on a phase change from gas to liquid and vice versa, the liquid filled control operates on an expansion or contraction of the liquid in the control system. As there is insufficient liquid in the capillary or bellows to cause control response, the control responds only to the temperature sensed at the control bulb which contains most of the liquid. This type of control is therefore adaptable to an air-conditioning unit where the control device is to be enclosed: however, the additional cost of this device often makes its substitution for the less expensive vapor filled control undesirable.

It is therefore an object of the invention to permit the use of an inexpensive controlling device in an air-conditioning unit where it is necessary to enclose the electrical components in fire resistant enclosures.

It is a further object of the invention to simplify the assembly of control elements in an air-conditioning unit.

These objects and other objects which will become apparent as the description proceeds, are achieved by providing an air-conditioning unit having a temperature control located in a fire resistant chamber. A portion of the air taken into the unit is by-passed into the chamber before reaching the conditioning medium. The temperature of the entire control therefore follows the temperature of the inlet air entering the chamber.

In using the inexpensive vapor filled type of control, both the vapor filled bulb and the controlling device are located in the chamber, thereby simplifying assembly of the unit. A bimetal operated type of control may be substituted for the vapor filled control, as the need for temperature sensing at two locations is eliminated by the invention.

For a better understanding of the invention reference should be had to the accompanying drawings, wherein.

Although the principles of the invention are broadly applicable to air-conditioning units in general, the invention is usually employed in a self-contained unit for cooling an enclosure, and hence it has been so illustrated and will be so described.

Figure 1:
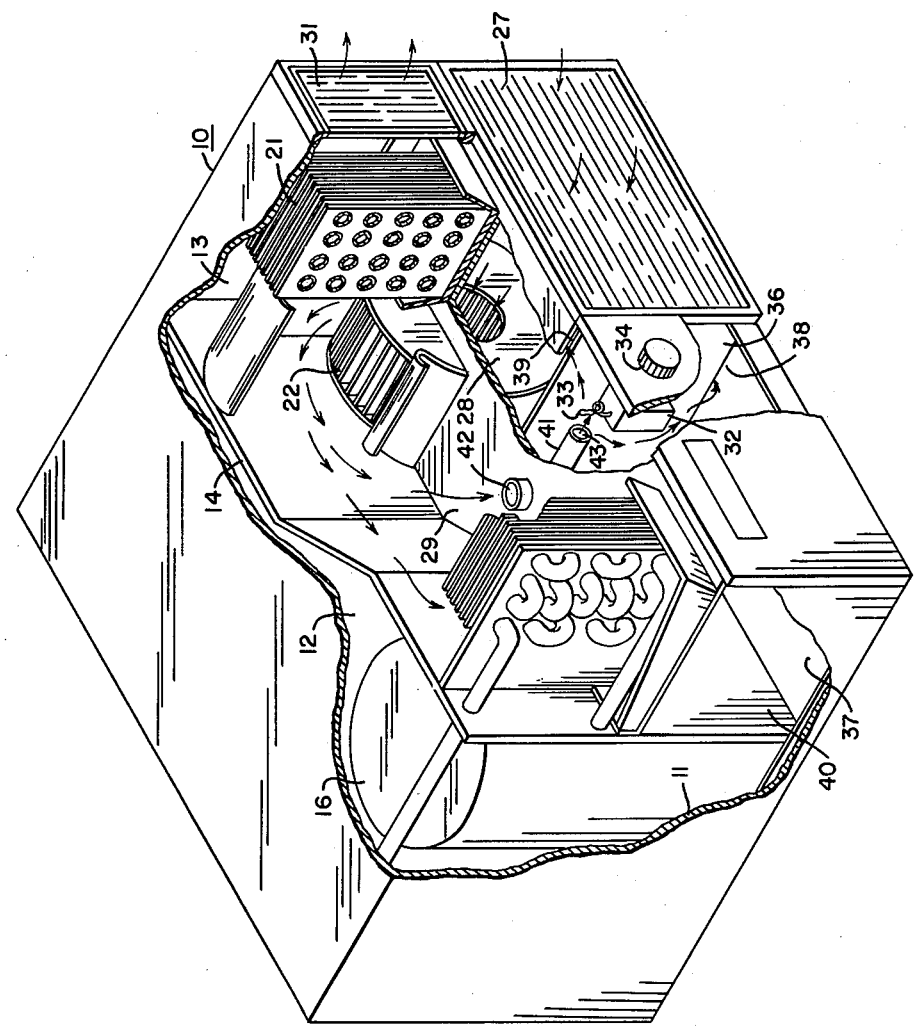
FIGURE 1 is a perspective view of one embodiment of the invention having a portion broken away for clarity.
Figure 2:
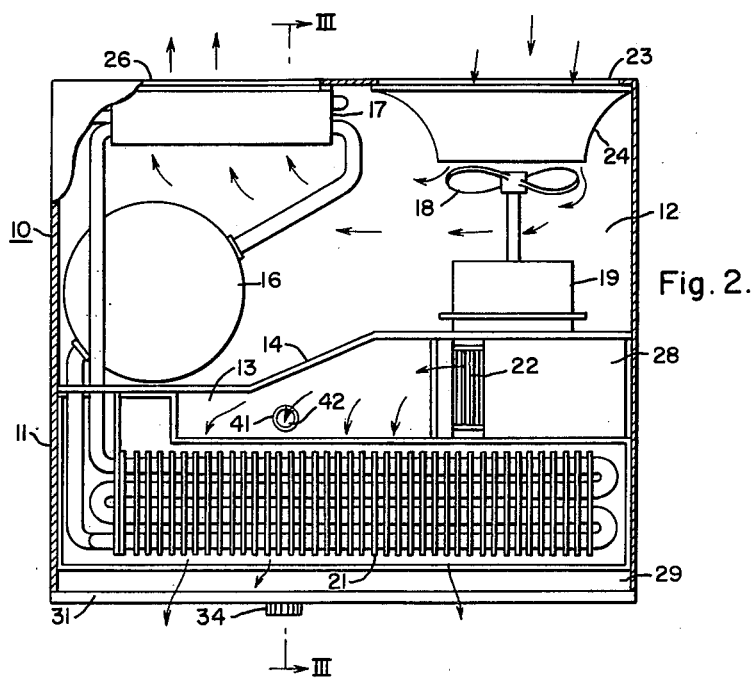
FIGURE 2 is a top plan view of the air-conditioning unit shown in FIGURE 1, having a portion broken away to better show the invention.

Referring to the drawings, especially FIGURES 1 and 2, the numeral 10 designates generally a self-contained room air-conditioner having a housing 11, the interior of which is divided into an outside air section 12 and a room or enclosure air section 13, by a partition 14.

The conditioning system enclosed by the housing 11 is a conventional compressor-condenser-expander type refrigerating circuit, and only those components deemed necessary for a complete explanation of the present invention have been shown in the drawings.

The outside air section 12 contains an electric motor-compressor unit 16 and a refrigerant condenser 17 of the refrigerating system, and a mixed flow fan 18 driven by an electric fan motor 19.

The room air section 13 contains an evaporator 21 of the refrigerating system and a radial flow blower 22 driven by the motor 19.

Figure 3:
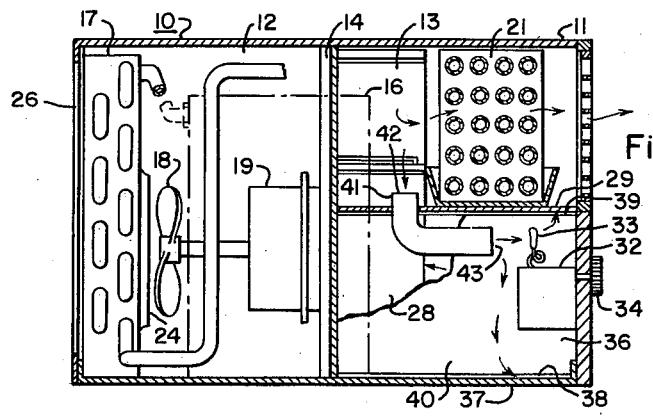
FIGURE 3 is a vertical sectional view taken along line III—III of FIGURE 2.

The compressor 16 operates to circulate refrigerant through the condenser 17 and the evaporator 21 to extract heat from the air passing through the room air section 13 and transfer it to the air passing through the outside air section 12. As indicated by the arrows in the drawings, (FIGURE 3) operation of the fan 18 causes air from outside the enclosure to enter the opening 23 and flow through the section 12, passing inwardly through the orifice 24 and then outwardly in heat transfer relation with the condenser 17 and through an opening 26. On the room air side of the unit 10, the air is drawn from the enclosure by the blower 22 into the opening 27 which provides an inlet to the room air section 13. The air then passes into the blower housing 28 from whence it is discharged adjacent the upper side of a support shelf 29 (FIGURE 1) and flows outwardly in heat transfer relation with the evaporator 21, and finally through an opening 31 which constitutes an outlet into the enclosure or room. Thus, it will be seen that the blower housing 28, support shelf 29, partition 14 and the housing 11 cooperates to provide duct means to direct the air flow through the room air section 13 of the unit 10.

A vapor-filled thermostatic control device 32 (FIGURES 1 and 3) including a control bulb 33, is interconnected to the electrical circuit of the compressor 16 and fan motor 19 in the usual manner to initiate and terminate operation of the cooling unit in response to a temperature sensed at the control bulb 33, the unit 32, or a point therebetween, whichever is at the lowest temperature. The device 32 has a manually operable control knob 34 which may be adjusted to vary the temperature setting at which the device 32 responds to initiate or terminate a cooling cycle.

In practicing the present invention, the control device 32 is disposed in room air section 13 below the support shelf 29, with the control knob 34 adjacent the front exterior of the housing 11 in a location convenient for the user. A vertical divider plate 36 is provided in the room air section 13 between the control device 32 and the inlet opening 27. The divider plate 36 is disposed with its vertical edges substantially abutting the partition 14 and the front wall of the housing 11, but with its horizontal edges in spaced relation to the base 37 of the housing 11 and the support shelf 29, thereby providing slots 38 and 39 respectively. The slots 38 and 39 may be about ⅛ inch wide and their function will become apparent as the description proceeds.

The control device 32 is thereby enclosed in a chamber 40 formed by the housing 11, the base 37, the shelf 29 and the divider plate 36, which chamber is a relatively fire resistant enclosure, and isolates the control element from the air flow through the section 13.

An air by-pass tube 41 extends through the shelf 29 and is disposed partially in the chamber 40. The tube 41 has an inlet 42 disposed above the shelf 29, and an outlet 43 directed toward the control device 32 and associated sensing element 33.

During operation of the unit 10, air is drawn from the room into the room air section 13 through the opening 27, into the blower housing 28 and then passed over the shelf 29 through the evaporator 21 and the opening 31 into the room. As best shown by the arrows in FIGURES 1 and 3, a portion of the air leaving the blower housing 28 enters the inlet 42 of the by-pass tube 41. This air is directed toward the sensing element 33 as it leaves the outlet 43 of the tube 41. The element 33 is positioned in close proximity to the control device 32, thereby allowing substantially the same air issuing from the tube 41 to influence both the sensing element and the control device. This control air from the tube 41 escapes from the chamber 40 through the slots 38 and 39. The control device 32 and the sensing element 33 are thus influenced by room air which is by-passed into the chamber 40 before it is in contact with the evaporator 21.

It should be obvious from the foregoing description, that a simple bimetal type of control could be substituted for the sensing element 33 and control device 32.

The invention therefore permits the use of an inexpensive controlling device such as the vapor-filled bulb or a bimetallic means in an air-conditioning unit where it is necessary to enclose the electrical components in fire resistant enclosures.

Further, by eliminating the need for locating a temperature sensing element at a remote point from the control device, the assembly of the control elements in the unit is greatly simplified.

While the invention has been shown in but one form, it will be obvious to those skilled in the art that it is not so limited, but is susceptible of various changes and modifications without departing from the spirit thereof.

We claim as our invention:

1. Apparatus for conditioning the air of an enclosure, including;
  a housing having
  air inlet means for entry of air to said housing from said enclosure,
  air outlet means for discharge of air from said housing into said enclosure, and
  duct means connecting said air inlet means with said air outlet means,
  conditioning means disposed in said duct means for conditioning air flowing therethrough,
  control means responsive to ambient air for controlling said conditioning means,
  wall structure in said housing defining a chamber enclosing said control means, and
  air bypass means connecting said chamber with said duct,
  said air bypass means opening into said duct means between said inlet means and said conditioning means,
  whereby a portion of air flowing through said duct means is bypassed into said chamber upstream of said conditioning means for influencing said control means.

2. In the apparatus defined in claim 1, air translating means effective to cause flow of air into said housing through said inlet means, and flow of air from said housing through said outlet means.

3. In the apparatus defined in claim 1, air translating means disposed in said duct means between said air inlet means and said air bypass means,
  said air translating means being effective to cause flow of air into said housing through said inlet means, and flow of air from said housing through said outlet means.

4. Apparatus for conditioning the air of an enclosure, including;
  a housing having
  air inlet means for entry of air to said housing from said enclosure, and
  air outlet means for discharge of air from said housing into said enclosure, and
  duct means connecting said air inlet means with said air outlet means,
  conditioning means disposed in said duct means for conditioning air flowing therethrough,
  control means responsive to ambient air for controlling said conditioning means,
  wall structure in said housing defining a chamber enclosing said control means, and
  a tubular member having an opening disposed in said duct means between said air inlet and said conditioning means and a second opening disposed in said chamber and directed toward said control means,
  whereby a portion of air flowing through said duct means is bypassed through said tubular member into said chamber for influencing said control means.

5. In the apparatus defined in claim 4, air translating means effective to cause flow of air into said housing through said inlet means and flow of air from said housing through said outlet means.

6. In the apparatus defined in claim 4, air translating means disposed in said duct means between said air inlet and said tubular member,
  said air transfer means being effective to cause flow of air into said housing through said inlet means and flow of air from said housing through said outlet means.

7. Apparatus for conditioning the air of an enclosure, including;
  a housing having
  air inlet means for entry of air to said housing from said enclosure,
  air outlet means for discharge of air from said housing into said enclosure, and
  duct means connecting said air inlet means with said air outlet means,
  heat transfer means disposed in said duct means,
  a thermostatic control for controlling the temperature of said heat transfer means,
  wall structure in said enclosure defining a chamber enclosing said thermostatic control, and
  air bypass means connecting said chamber with said duct,
  said air bypass means opening into said duct means between said inlet means and said heat transfer means,
  whereby a portion of air flowing through said duct means is bypassed into said chamber upstream of said heat transfer means for influencing said thermostatic control.

8. In the apparatus defined in claim 7, air translating means effective to cause flow of air into said housing through said inlet means and flow of air from said housing through said outlet means.

9. In the apparatus defined in claim 7, air translating means disposed in said duct means between said air inlet means and said air bypass means,
  said air translating means being effective to cause flow of air into said housing through said inlet means, and flow of air from said housing through said outlet means.

10. Apparatus for conditioning the air of an enclosure, including;

a housing having air inlet means for entry of air to said housing from said enclosure, air outlet means for discharge of air from said housing into said enclosure, and duct means connecting said air inlet means with said air outlet means, heat transfer means disposed in said duct means, a thermostatic control for controlling the temperature of said heat transfer means, wall structure in said enclosure defining a chamber enclosing said thermostatic control, and a tubular member having an opening disposed in said duct means between said air inlet and said heat transfer means and a second opening disposed in said chamber and directed toward said thermostatic control, whereby a portion of air flowing through said duct means is bypassed through said tubular member into said chamber for influencing said thermostatic control.

11. In the apparatus defined in claim 10, air translating means effective to cause flow of air into said housing through said inlet means and flow of air from said housing through said outlet means.

12. In the apparatus defined in claim 10, air translating means disposed in said duct means between said air inlet means and said tubular member, said air translating means being effective to cause flow of air into said housing through said inlet means and flow of air from said housing through said outlet means.

13. An air-conditioning unit comprising a refrigerating system having a compressor and an evaporator, a housing for said refrigerating system, an inlet opening in said housing for entry of air to said housing, an outlet opening in said housing for discharge of air from said housing, duct means connecting said inlet with said outlet and having said evaporator disposed therein, a thermostatic control for controlling the operation of said compressor, wall structure in said housing defining a chamber enclosing said thermostatic control, and a tubular member having an opening disposed in said duct means between said inlet and said evaporator and a second opening disposed in said chamber and directed toward said thermostatic control, whereby a portion of air flowing through said duct means is bypassed through said tubular member into said chamber for influencing said thermostatic control.

14. An air-conditioning unit as defined in claim 13 having a blower disposed in said duct means for causing flow of air into said inlet opening and flow of air from said outlet opening.

15. An air-conditioning unit comprising a refrigerating system having a compressor and an evaporator, a housing for said refrigerating system, an inlet opening in said housing for flow of air into said housing, an outlet opening in said housing for discharge of air from said housing, duct means connecting said inlet with said outlet for directing flow of air therebetween, said duct means having said evaporator disposed therein, and a blower provided in said duct between said inlet opening and said evaporator, a thermostatic control for initiating and terminating operation of said compressor, said control including a temperature sensing bulb, wall structure in said housing defining a chamber enclosing said thermostatic control, and a tubular member having an opening disposed in said duct means between said blower and said evaporator and a second opening disposed in said chamber and directed toward said temperature control bulb, whereby a portion of air flowing through said duct means is bypassed through said tubular member into said chamber for influencing said thermostatic control.

References Cited by the Examiner
UNITED STATES PATENTS 1,770,765   7/30   Bulkeley _____ 236—34
3,070,972   1/63   Atchison _____ 62—180

ROBERT A. O'LEARY, *Primary Examiner.*